United States Patent [19]

Binder et al.

[11] Patent Number: 5,318,765
[45] Date of Patent: Jun. 7, 1994

[54] MONOCLINIC ZIRCONIUM DIOXIDE, METHOD OF ITS PRODUCTION AND USE

[75] Inventors: Dieter Binder, Alzenau; Peter Kleinschmit, Hanau; Hans Hoffmeister, Gelnhausen; Roland Reuter, Darmstadt, all of Fed. Rep. of Germany

[73] Assignee: Degussa Aktiengesellschaft, Frankfurt, Fed. Rep. of Germany

[21] Appl. No.: 842,610

[22] Filed: Feb. 27, 1992

[30] Foreign Application Priority Data

Mar. 1, 1991 [DE] Fed. Rep. of Germany .... 4106535.2

[51] Int. Cl.⁵ .................... C01G 25/02; C04B 35/48
[52] U.S. Cl. .................................... 423/608; 501/95; 501/103; 106/450
[58] Field of Search ............... 423/608, 265, 266, 325, 423/326, 336, 338; 501/95, 102, 103, 106, 133; 106/57, 450

[56] References Cited

U.S. PATENT DOCUMENTS

| | | | |
|---|---|---|---|
| 3,811,907 | 5/1974 | Scammon, Jr. et al. | 106/299 |
| 4,279,655 | 7/1981 | Garvie et al. | 423/608 |
| 4,829,028 | 5/1989 | Seki et al. | 501/105 |
| 5,011,673 | 4/1991 | Kriechbaum | 423/608 |
| 5,169,809 | 12/1992 | Brenna et al. | 423/608 |

FOREIGN PATENT DOCUMENTS

| | | |
|---|---|---|
| 746895 | 8/1970 | Belgium . |
| 0314939 | 5/1989 | European Pat. Off. . |
| 1927935 | 12/1970 | Fed. Rep. of Germany . |
| 45-30450 | 10/1970 | Japan . |
| 1097134 | 5/1986 | Japan . |
| 1111919 | 5/1986 | Japan . |
| 403232724 | 10/1991 | Japan . |
| 1248595 | 10/1971 | United Kingdom . |
| 1447276 | 8/1976 | United Kingdom . |

OTHER PUBLICATIONS

"Zirconia Production Stepped Up," Ceramics, Feb. 1974, p. 30.
W. C. Butterman et al., Amer. Mineralogist 52 (1967) p. 884.

Primary Examiner—David Brunsman
Attorney, Agent, or Firm—Beveridge, DeGrandi, Weilacher & Young

[57] ABSTRACT

A monoclinic zirconium dioxide with an $SiO_2$ content below 1.0% by weight is provided which is characterized by dendrite-shaped particles with an average grain size ($d_{50}$ value) in a range of 0.5 μm to 3.0 μm and a specific surface (BET) in a range of 3 to 15 $m^2/g$. This zirconium dioxide is produced by thermally splitting zirconium silicate in a high-frequency- or medium-frequency induction melting furnace with sintering crust crucible, quenching the melt by blowing on a stream of melt with air and/or spraying it with water and leaching out the thermally split zirconium silicate with concentrated alkali lye at 100° 200° C. The zirconium dioxide of the invention provides a material with improved suitability for the production of zirconium silicate pigments of the host lattice type and inclusion type so as to provide for more color-intensive pigments.

9 Claims, 3 Drawing Sheets

1 μm

1μm

MONOCLINIC ZIRCONIUM DIOXIDE, METHOD OF ITS PRODUCTION AND USE

FIELD OF THE INVENTION

The invention is relative to monoclinic zirconium dioxide, a method of its production from thermally split zirconium silicate produced in a certain manner and its use for producing pigments based on zirconium silicate.

BACKGROUND DISCUSSION

Zirconium dioxide ($ZrO_2$), either in the form of the naturally occurring mineral baddeleyite or in the form of synthetically produced products (with partially different material parameters than the raw material), is used in the ceramics industry, e.g. for producing zirconium dioxide ceramics and pigments based on zirconium silicate.

Zirconium dioxide with a content above 99% is obtained from ores containing baddeleyite by means of grinding, flotation and chemical treatment (acid wash). The quality of the zirconium dioxide is subject by nature to variations and the $d_{50}$ value (50% value of the residual summation curve) is generally above 15 $\mu m$, which limits the reactivity in the case of solid-state reactions and renders its utility problematic in the production of pigments. The $d_{50}$ value can be lowered by grinding but at the same time the rubbings from the grinding unit such as e.g. $Al_2O_3$ and MgO cause new problems.

The thermal decomposition of zirconium sand ($ZrSiO_4$) with soda, with subsequent hydrolytic treatment of the sodium zirconium silicate produced and optional calcining and grinding, can result in zirconium dioxides with a $d_{50}$ value (measured by means of laser diffraction) in a range between 2 and 5 $\mu m$ and whose BET surface is between 3 and 15 $m^2/g$. From a morphological standpoint, these products are essentially spherical particles and agglomerates.

A disadvantage of these products is their usually insufficient suitability for use in structural ceramics as well as, in particular, their high price, which sets very narrow limits to their use in the production of pigments.

Zirconium dioxide can also be obtained by the thermal splitting of zirconium silicate ($ZrSiO_4$) with subsequent separation of the silica. The thermal splitting of zirconium silicate takes place at temperatures above approximately 1700° C.-W. C. Butterman et al., Amer. Mineralogist 52 (1967), p. 884. $ZrSiO_4$ begins to decompose at approximately 1760° C. into tetragonal, solid $ZrO_2$ and liquid $SiO_2$. Above approximately 2400° C., $ZrO_2$ and $SiO_2$ form a uniform liquid which solidifies by means of a rapid cooling off-the thermally split zirconium silicate obtainable in this manner is an amorphous silica phase in which zirconium dioxide crystals are embedded and can be separated from the $SiO_2$ phase by flotation methods and/or leaching methods. Plasma methods and arc methods are also known for the thermal splitting of $ZrSiO_4$.

In the plasma methods-see Great Britain Patent No. 1,248,595 and Ceramics, February 1974, p. 30-a curtain of pulverized zirconium sand is allowed to trickle through the flame of the plasma burner, during which the zirconium silicate is thermally split and then cooled off. A complete splitting of the $ZrSiO_4$ requires the use of extremely finely ground zirconium powder. The grinding of the zirconium sand is energy-intensive and, in addition, foreign substances from the powder aggregate are typically entrained. The products obtainable in the plasma method contain $ZrO_2$ crystals with a diameter of 0.1 to 0.2 $\mu m$ and a length of many $\mu ms$ (see Great Britain Patent No. 1,447,276) and exhibit a different morphology than that of the products in accordance with the invention.

According to another method, zirconium silicate is melted in an arc and allowed to solidify as a block, the melted body is then subsequently broken and ground-(see Gmelin's Handbuch der anorganischen Chemie (i.e., Gmelin's Handbook of Inorganic Chemistry), zirconium, volume 42 (1958), p. 56). The thermally split zirconium silicate produced in this manner contains zirconium dioxide with an average grain or particle size ($d_{50}$ value) of approximately 15 to 20 $\mu m$ and a BET surface of approximately 0.5 $m^2/g$.

Alternatively, the melt can also be removed from an arc melting furnace and converted into a spherical product by means of cooling off in air-(see German Patent No. 26 35 030). An applicant of the present invention determined that the grain distribution of the zirconium dioxide in a thermally split zirconium silicate produced in this manner results in an average grain diameter-$d_{50}$ value, determined by laser diffraction-of over 3 $\mu m$ and in a specific surface according to BET of approximately 2 $m^2/g$. The determination of the substance's characteristics took place here, as in the other instances, on zirconium dioxide obtained by leaching out the thermally split zirconium silicate with concentrated sodium hydroxide solution to a residual $SiO_2$ content of below 0.5% by weight.

The utility of the zirconium dioxides derived from the thermally split zirconium silicates produced in accordance with the above described methods for the production of ceramic pigments is limited on account of the zirconium dioxides' relatively low specific surface and/or high $d_{50}$ value and, in addition, a broad grain spectrum. Thus, much remains to be desired when such products are used regarding the color intensity and/or the color tone in a given pigment recipe.

SUMMARY OF THE INVENTION

The invention therefore is directed at the problem of making available a monoclinic zirconium dioxide which is better suited for the production of ceramic pigments based on zirconium silicate inclusion pigments and host lattice type pigments. A further problem to which the present invention is directed is to provide a method for producing the zirconium dioxide described above. In addition, the present invention is directed at producing zirconium dioxide that exhibits material parameters which are expected from a raw material used in the production of structural ceramics.

Monoclinic zirconium dioxide with an $SiO_2$ content below 1.0% was produced in accordance with the present invention and found to be characterized by dendrite-shaped particles with an average grain size ($d_{50}$ value) in a range of 0.5 $\mu m$ to 3.0 $\mu m$ and a specific surface (BET) in a range of 3 to 15 $m^2/g$. Preferred zirconium dioxides have an $SiO_2$ content of less than 0.5% by weight, especially less than 0.2% by weight. A more preferable zirconium dioxide is also producible in accordance with the present invention so as to have a $d_{50}$ value (determined by laser diffraction) in a range of 0.5 to 2.0 $\mu m$ and a specific BET surface in a range of 5 to 12 $m^2/g$. Especially advantageous zirconium dioxide produced in accordance with the present invention is distinguished by a narrow grain spectrum with at least 90% of the zirconium dioxide comprised of particles with a diameter of less than 10 μm and, more preferably, less than 5 μm and greater than 0.2 μm.

The grain distribution (including the $d_{50}$ value) was determined by laser diffraction with water as the suspension liquid, Na pyrophosphate as the dispersing agent and 5 minutes of ultrasound mixing in an HR 850 granulometer of the Cilas-Alcatel company. The BET surface was determined according to DIN 66131 with nitrogen as the adsorption gas.

The zirconium dioxide of the invention exhibits a morphology designated as dendrite-shaped, as is apparent from the photograph of FIG. 3 taken with a scanning electron microscope.

The zirconium dioxides of the invention differ in their material data from previously known products. They exhibit advantages in their use as a raw material for zirconium silicate pigments which could not have been foreseen. Obviously, the specific morphology, the $d_{50}$ value and the BET surface lead to the advantages of the present invention including an increase in the color intensity and/or color-tone shift in the desired direction.

The term "zirconium silicate pigments of the host lattice type" includes those in particular in which $Zr^{4+}$ positions in the lattice are occupied in a valently compensated manner by chromophobic ions such as, in particular, vanadium-(blue), praseodymium-(yellow) or terbium ions (yellow) (see, for example, U.S. Pat. No. 2,441,447 and Great Britain Patent No. 1,447,276 and prospectus 2/83, No. 59 of the Th. Goldschmidt company). Of the pigments of the inclusion type, there is known pigments in which the color-bearing component (e.g. cadmium sulfoselenides, iron oxides, iron titanates, colloidal metals and iron-manganese compounds) are inclosed in a casing of zirconium silicate (see German Patent No. 23 12 535, German Patent No. 23 23 770, German Patent No. 21 43 525 and German Patent No. OS 39 06 818 as well as European Patent No. 0,294,664.

The novel zirconium dioxides of the present invention can also be used for the production of structural ceramic materials because they are sufficiently pure and exhibit the grain spectrum required for this purpose.

The monoclinic zirconium dioxides of the present invention can be produced by leaching out the amorphous silica from thermally split zirconium silicate with alkali lye at 100° to 200° C. and a molar ratio of $SiO_2$ to alkali hydroxide of 1 to at least 2 and separating the zirconium dioxide obtained thereby from the aqueous solution of alkali silicate. The zirconium dioxides produced in this manner are derived from a thermally split zirconium silicate that was produced by melting zirconium silicate in a high-frequency or medium-frequency induction melting furnace with a sintering crust crucible at a temperature in a range of 2500° to 3000° C., quenching the melt by drawing it off in the form of a stream, fanning it out in a free fall by blowing on it with an inert cool gas and/or by spraying it with water and quenching it thereby and, to the extent desired, comminuting it by breaking and/or grinding.

In order to produce the thermally split zirconium silicate serving as initial product, it is advantageous if a thin molten stream with a width of especially 5-20 mm is drawn off via a channel from the crucible and if compressed air is blown on it with one or several nozzles. In general, the gas used should be at room temperature but higher or lower temperatures are also possible. Alternatively, the melt is sprayed, also while in free fall, with water from one or several nozzles. According to an especially preferred embodiment, air or some other gas is first blown on the molten stream and then, while it is still in a free fall, water is sprayed on it, preferably from two or more optionally adjustable, superposed nozzles. In order to quench the drawn-off melt, 0.1 to 3 $Nm^3$ air per kg melt is generally sufficient. For the quenching by spraying with water, an amount of water in a range of 10 to 100 liters per kg melt has proven to be suitable. The product which has now solidified, can be further cooled, to the extent necessary, in a water basin or a water groove. The product precipitates in the form of granules with a length of approximately 1 mm to 10 mm and can be supplied to the leaching directly or after the breaking and/or grinding.

The manner of quenching is decisive for producing the preferred material characteristics of the thermally split zirconium silicate and of the zirconium dioxide contained in it. A slow cooling off of the melt results in larger $ZrO_2$ crystals which entail the above-described disadvantages in the production of pigments. A simple pouring of the melt into water yields products with a very broad grain spectrum, which is disadvantageous for the formation of pigments and which is outside of the claimed range.

Of course, a melt of thermally split zirconium silicate produced in an arc furnace can also be quenched in the previously described manner in order to obtain an initial material suitable for the leaching. However, it is especially advantageous if the production of the melt takes place in an induction melting furnace like the one shown in European Patent No. B 0,119,877.

Zirconium silicate is cited by way of example in this European patent as a material to be melted. However, there is lacking any suggestion concerning the thermal splitting and the manner of how melt should be uniformly removed and quenched. According to an embodiment described in this European Patent, the furnace comprises an optionally cooled tube exiting laterally through the induction coil structure which tube is intended to serve for the removal of the melt. The melt exits the tube and is allowed to run out into a water basin. In the case of a melt of thermally split zirconium silicate, an increase in volume occurs during the cooling off, so that the run-off tube becomes clogged. An opening of the run-off tube with chiseling and boring tools proved to be unsatisfactory on account of the hardness and brittleness of the solidified melt.

To achieve the advantages of the present invention, it is important that a uniform stream of melt be removed from the furnace and supplied to the quenching device. Such uniformity in the melt stream is possible if the method is carried out in a semi-continuous manner in an induction melting furnace whose wall is designed as a melting coil structure that encases a sintering crust crucible. A part of the melt, preferably 5 to 30% of the crucible contents, is removed at periodic intervals and a corresponding amount of zirconium silicate is supplied to the crucible (e.g., an amount which when melted represents the same volume as that which was discharged from the crucible). An open outlet channel groove, which is located at the upper edge of the induction coil structure and is intensively cooled, is used as a run-out device. The melt discharge is started at periodic intervals by broaching or tapping the melt with a broaching device and the discharged amount is regulated as required by controlled tipping of the furnace with a tipping device. The broaching device comprises a broaching lance and automatically controllable devices for varying the angle of inclination or for a vertical parallel shifting of the broaching lance, which is positioned horizontally or at an incline, and for driving and retracting the latter. The broaching lance is guided in such a manner that it first catches below the melt nose of an amount of solidified melt from the preceding melt broaching remaining in the run-out groove and then raises the solidified melt so that the lance can subsequently be driven forward between the raised, solidified melt and the bottom of the channel until the sintered crust is pierced.

DETAILED DESCRIPTION OF THE PREFERRED EMBODIMENTS

Figure 1:
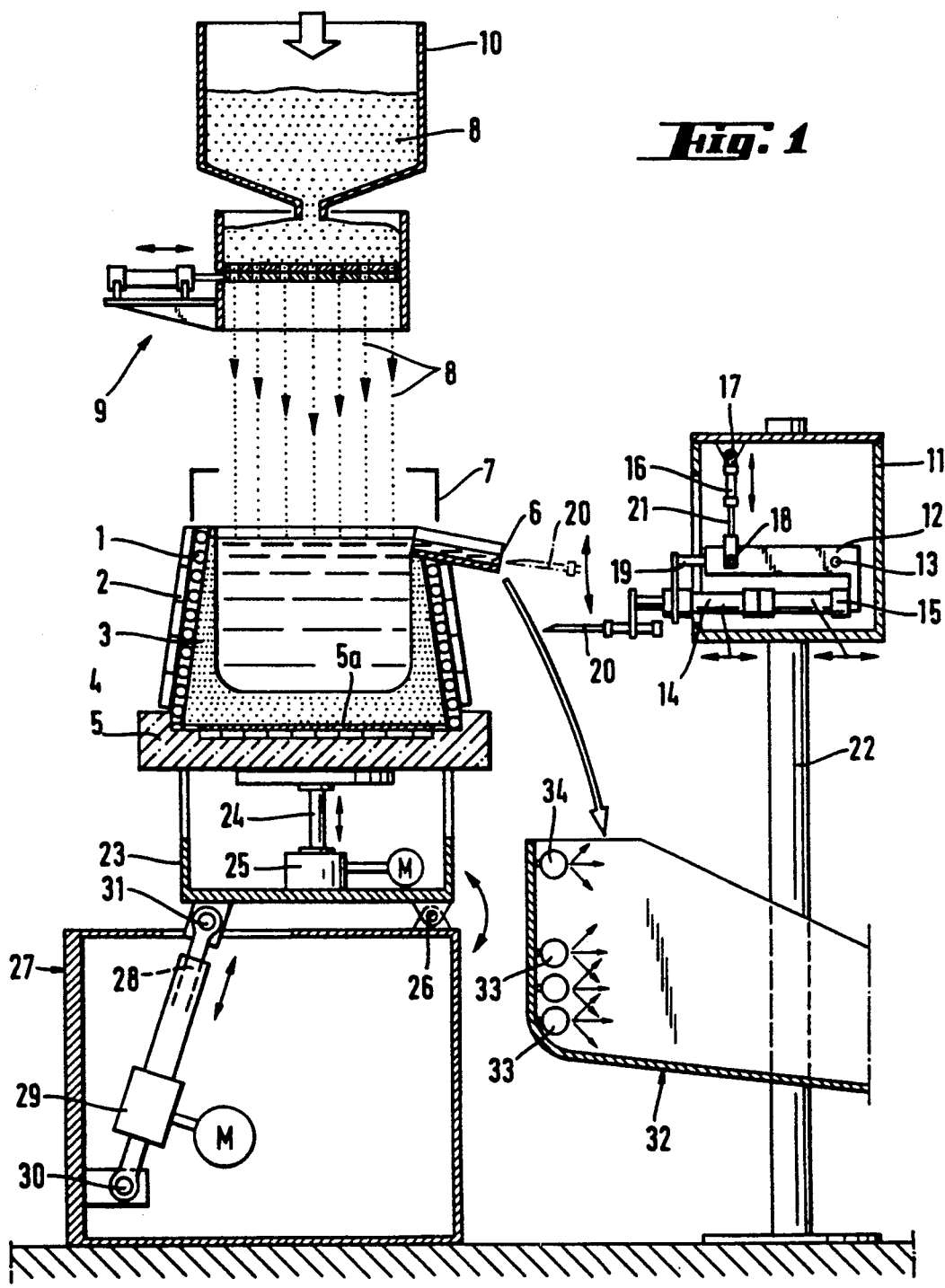
FIG. 1 shows an induction melting system suitable for the method of the present invention with devices for filling the furnace, for broaching the melt and for cooling off the melt. The capacitors of the oscillating circuit, of the frequency generator and of the other necessary electric devices are well known, per se, in the art and are therefore not shown. The resonance frequency of the oscillating circuit can be generated in the high-frequency range (greater than 10 kHz) by means of tube generators and in the medium-frequency range (around/less than 10 kHz) by means of thyristor-controlled generators of the inverter type.

In FIG. 1, reference numeral 1 denotes a melting inductor coil structure surrounded by cooling device 2. Inductor coil structure 1 encases sintering crust crucible 3 which is formed from the material to be melted and is shaped to receive melt 4. The melting inductor coil structure rests on cast form 5, which also receives cooled coil bottom 5a, which is insulated from melting inductor coil structure 1. Open run-off channel 6 is fixed in the area of the upper edge of the melting inductor coil structure (by means of holding device 6/4 shown in FIG. 2 and by bores 6/5 for fastening elements) in such a manner that the channel bottom is located before the broaching point of the melt and below the level of the melt and such that the upper edge of the channel essentially coincides with the upper edge of the melting inductor coil structure 1.

The melting inductor coil structure 1 can have one or several coil windings although single-winding coils of copper or aluminum are preferred because this makes it possible to use coils that have larger diameters, which is a prerequisite for using the furnace on a manufacturing scale. In order to facilitate the removal of the melt regulus after the end of the melting with periodic melt broachings and cooling-off, it is advantageous to employ an inductor coil structure having a coil body in a slightly conical form (according to FIG. 1) because the melt material expands when cooling off due to modification transformations.

The melt crucible is charged from storage container 10, from which the material to be melted is supplied to a device 9 for the gravitational and areal dosing of material 8 over the receiving end of melting inductor coil structure 1. In order to minimize heat losses, thermal protection shields 7 can be arranged around the upper edge of the furnace. In addition, it is advantageous to keep the crucible surface covered with the material to be melted.

The solidified regulus can be readily removed from the melting inductor coil structure by means of a device 23 for raising and lowering the form 5 and coil bottom 5a. As shown in FIG. 1, device 23 includes a lift cylinder 24 and a drive unit 25.

The amount of melt outflow can be regulated by controlled tilting of the furnace with tilting device 27. Tilting device 27, which also can be designed in various other forms, includes lift rod 28, drive unit 29, points of attachment 30 and 31 of the lifting device and point of furnace rotation 26.

Device 32 serves for the further treatment of the melt periodically running out via channel 6. Device 32 includes compressed-air nozzle 34 and spray nozzle 33 for water (3 superposed nozzles shown). The solidified material is contained in device 32 which is designed as a vat for supplying solidified material to the drying devices and breaking and grinding devices (not shown).

The embodiment of the melt-broaching device shown in FIG. 1 comprises a lifting device designed as a pneumatic cylinder 16 pivotably fixed at one end to fastening point 17 of holder 11. Lifting rod 21 is pivotably attached to shackle 12 at point of rotation 18, shackle 12 receives advancing (and retractable) linkage assembly 19 and is rotatably fastened to holder 11 at fastening point 13. The angle of inclination of broaching lance 20 can be varied in a vertical direction by activating the lift cylinder and can be adapted therewith to the angle of inclination of run-out channel 6. A device for advancing and retracting the broaching lance and linkage assembly 19 carrying the lance is formed by two pneumatic cylinders 14,15 which are fastened to shackle 12 and receive the advancing linkage.

Figure 2:
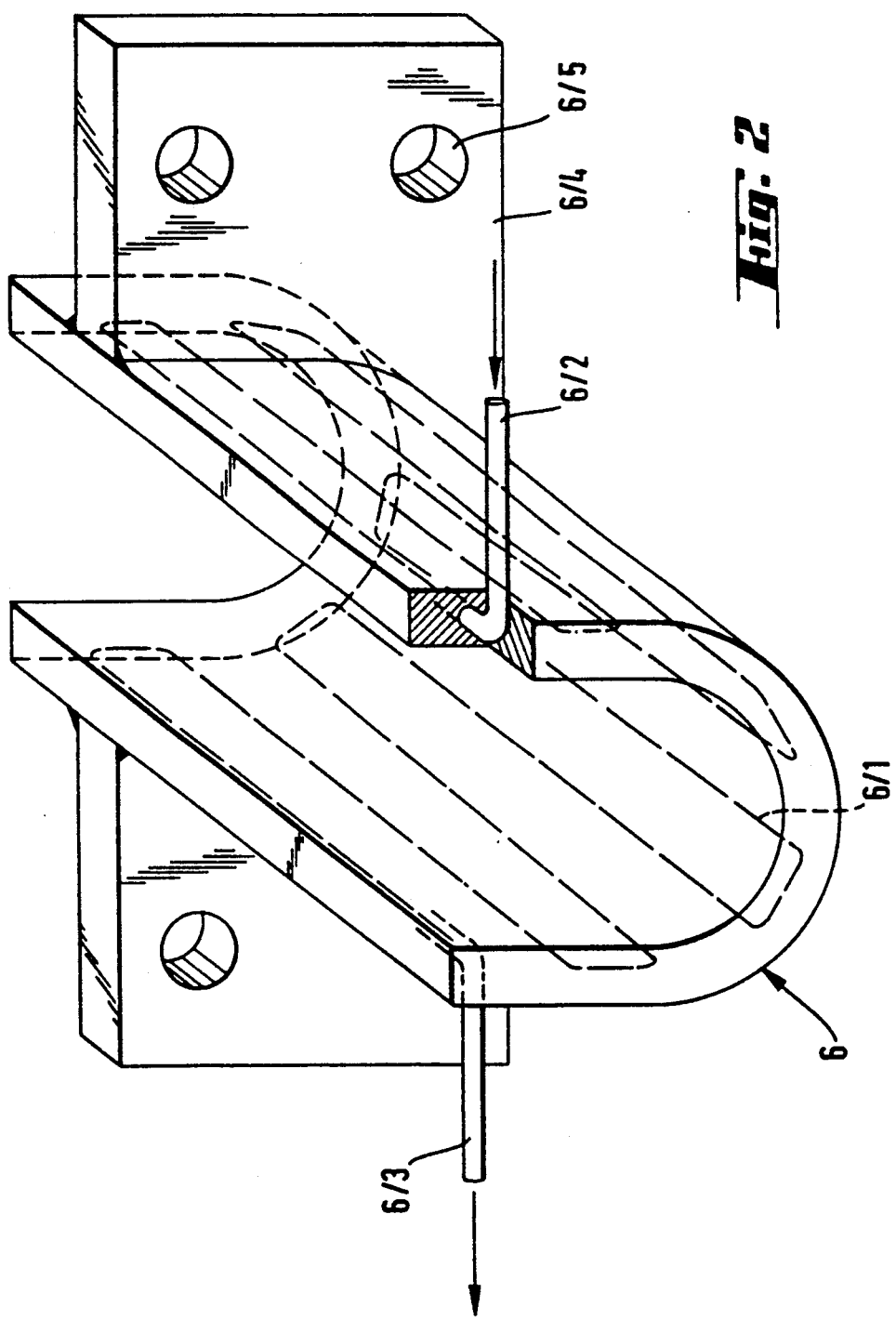
FIG. 2 shows an advantageous run-out channel for the melt.
Figure 3:
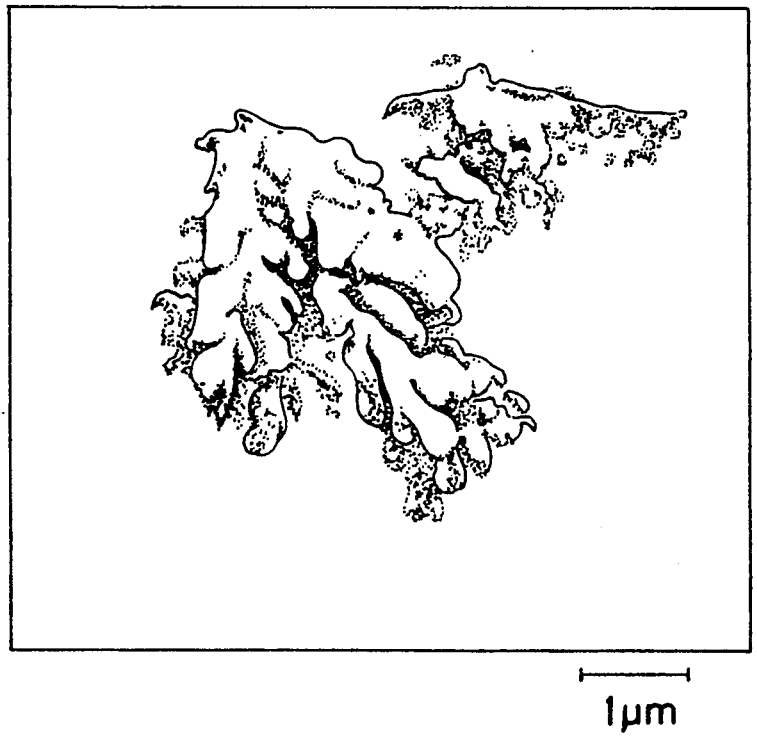
FIG. 3 shows a scanning electron microscope photograph of zirconium dioxide of the invention exhibiting a dendrite-shape.

FIG. 2 shows a preferred embodiment of the coolable channel 6 which is U-shaped and thus open on top. The channel's jacket contains a maximum number of internal bores 6/1 parallel to the longitudinal direction of the groove (shown in dotted lines in FIG. 2) which are connected to each other in a meandering fashion and through which a cooling medium flows which is supplied through line 6/2 and removed through line 6/3. Holder 6/4, which is fixed to the melting inductor coil structure 1 by means of fastening elements (6/5 represents a bore for this purpose), serves to position the channel. As intensive a cooling of the groove as possible is preferred because under this condition no cakings occur in the melting operation aside from a readily removable melt nose.

The leaching of the thermally split zirconium silicate takes place in a known manner using alkali lye, especially sodium hydroxide solution with a content in a range of 30 to 50% by weight. The leaching can take place in one or in several stages in an isothermal or isobaric reaction. One stage results in zirconium dioxides with below 1% by weight, usually approximately 0.5% by weight residual $SiO_2$ if a 10% excess of alkali lye is used. Products with a lower $SiO_2$ content, that is below 0.5% by weight, especially below 0.2% by weight can be obtained if a second leaching stage follows using a greater excess of alkali hydroxide-relative to the $SiO_2$ still present. The leaching is generally carried out in a temperature range between 100° and 200° C. If, for example, 50% by weight sodium hydroxide solution is used, the temperature during the isobaric leaching drops in the open reactor from approximately 150° C. to approximately 115° C. In an isothermal reaction the temperature rises during the leaching. After the leaching, the zirconium dioxide obtained is separated by means of customary separation devices, e.g. filter presses, from the water glass solution or washing lye and dried. A grinding of the product after the first or the second leaching step in a ball mill can be advantageous.

The method can be carried out on an industrial scale in a simple manner. No expensive fine grinding of the zirconium sand prior to the thermal splitting is necessary for this. The zirconium dioxide obtainable in accordance with the invention is distinguished by a high purity, which results, in conjunction with the material properties in accordance with the claims, in its particular suitability for the production of ceramic pigments and structural ceramics.

EXAMPLES 1a AND 1b

In the system shown in FIG. 1, zirconium silicate was melted, a melt broaching was periodically carried out and quenching was performed by means of a compressed-air nozzle and two or three superposed water spray nozzles. The material was melted at 2700° C. using a single-winding melting coil-diameter 40 cm, height 25 cm and operating at a frequency of 120 kHz. The width of the run-out channel (according to FIG. 2) is 8 mm while the cooling-water flowthrough is 400 liters/h. The throughput of zirconium silicate is 20 kg/h with 4 to 5 broachings per hour. Approximately 4 $Nm^3$ air and approximately 200 liters (example 1b) or 300 liters (example 1a) water were used per melt broaching for the quenching. The leaching of the thermally split zirconium silicate obtained in this manner took place with 50% by weight sodium hydroxide solution at a molar ratio of $SiO_2$ to NaOH of 1 to 2.2. The leaching was performed at atmospheric pressure in the open reactor starting at 148° C. After decanting, post-washing and drying, zirconium dioxide with an $SiO_2$ content of 0.25 and 0.3% by weight was obtained for the two examples. The material data follows from the table.

| Type of quenching | Example 1a<br>1 air nozzle and<br>3 water nozzles | Example 1b<br>1 air nozzle and<br>2 water nozzles |
|---|---|---|
| Grain distribution* | | |
| $d_{10}$ (μm) | 2.92 | 7.35 |
| $d_{50}$ (μm) | 0.94 | 1.96 |
| $d_{90}$ (μm) | 0.37 | 0.44 |
| Spec. surface (BET) $m^2/g$ | 8.5 | 6.1 |
| $SiO_2$ content (% by weight) | 0.25 | 0.3 |

*The $d_{10}$ and $d_{90}$ values indicate that 10 or 90% of the material exhibits particle diameters above the indicated values. The $d_{50}$ value is the average particle diameter.

EXAMPLE 2 AND REFERENCE EXAMPLE 2

Production of a zirconium-iron pigment

A powder mixture was produced, annealed, worked up and tested in a glaze test in analogy with example 2 of German Patent No. 21 43 525. The thermally split zirconium dioxide according to example 1a was used in example 2 and, in the reference example 2, zirconium dioxide of the Huls. AG company was used ("Dynazirkon M" which was produced by leaching the thermally split zirconium silicate "DIN 100" with a $d_{50}$ value of 16.5 μm and a BET surface of 0.5 $m^2/g$).

The powder mixture featured the following ingredients:

| | |
|---|---|
| $ZrO_2$: | 34 g |
| $SiO_2$: | 20 g |
| $FeSO_4.7H_2O$: | 24 g |
| NaF: | 12 g |
| NaCl: | 5 g |
| $KNO_3$: | 5 g |

Mixing: 2 hours in a centrifugal ball mill (grinding cup of hard porcelain 350 ml, grinding balls of $Al_2O_3$ φ30 mm 4 hrs.)

Annealing: Heat in 100 ml fireclay crucible, smeared with $ZrSiO_4$, covered with $Al_2O_3$ fragments, in 2 hours to 1050° C., 0.5 hour dwell time.

Workup: Comminution of the reddish-brown annealing material after addition of 30 ml water in ball mill (see above), wash by means of a fivefold decanting with 1 liter water per time, dry at 110° C. in a drying cupboard.

Glaze test: Zirconium-clouded glaze, dyeing 6% pigments in glaze slip which is applied with a glaze carriage onto on earthenware body.

Glaze baking: Heat-up time 7 hours to 1100° C. Dwell time 45 min. at 1100° C.

Color values: CIE-Lab-color system (DIN 5033, 6164, 6174)

| | Example 2 | Reference example 2 |
|---|---|---|
| L | 62.2 | 69.2 |
| a | 18.9 | 12.4 |
| b | 16.6 | 13.3 |

In the CIE-Lab color system, axis L defines the brightness wherein L=100 white and L=0 black. In the a axis, +a defines the red value and —a defines the green value. Also, in the b axis, +b defines the yellow value and —b defines the blue value. In the above Table, the L-value of the present invention's example 2 is lower than that of the comparative example; this corresponds to an increase in intensity. A redder shade in the present invention can be seen from the steep increase in the a value and the moderate increase in the yellow value.

Based on the values above, the product of the invention results in a more intensive and redder pigment.

Further variations and modifications will be apparent to those skilled in the art and are intended to be encompassed by the claims appended hereto.

German Priority Application No. P 41 06 535.2 is relied on and incorporated herein by reference.

What is claimed is:

1. Monoclinic zirconium dioxide with an $SiO_2$ content below 1.0% by weight, said monoclinic zirconium dioxide having dendrite-shaped particles with an average particle or grain diameter in a range of 0.5 μm to 3.0 μm and a specific surface area in a range of 3 to 15 $m^2/g$, and at least 90% of the zirconium dioxide being comprised or particles with a diameter of less than 10 μm and greater than 0.2 μm.

2. The monoclinic zirconium dioxide according to claim 1, characterized in that the the average particle diameter of the zirconium dioxide is in a range of 0.5 μm to 2.0 μm and the specific surface area is in a range of 5

$m^2/g$ to 12 $m^2/g$ and the $SiO_2$ content is below 0.5% by weight.

3. The monoclinic zirconium dioxide according to claim 1, characterized in that at least 90% of the zirconium dioxide is comprised of particles less than 5 $\mu m$ and greater than 0.2 $\mu m$.

4. Monoclinic zirconium dioxide formed by a process comprising:

melting zirconium silicate into a melt in an induction melting furnace with a sintering crust crucible at a temperature in a range of 2500° to 3000° C.;

quenching the melt by drawing the melt off in a stream and cooling the stream by subjecting the stream, while in a free fall, to a spray of fluid so as to form thermally split zirconium silicate;

leaching out amorphous silica from the thermally split zirconium silicate with alkali lye at 100° to 200° and a molar ratio of $SiO_2$ to alkali hydroxide of 1 to at least 2 so as to obtain zirconium dioxide;

separating the zirconium dioxide from the aqueous solution of alkali silicate, whereby said monoclinic zirconium dioxide has a dendrite-shaped morphology, a specific surface area of 3 to 15 $m^2/g$ and at least 90% of the zirconium dioxide formed by the process is comprised of particles with a diameter of less than 10 $\mu m$ and greater than 0.2 $\mu m$.

5. Monoclinic zirconium dioxide as recited in claim 4, wherein at least 90% of the zirconium dioxide produced is comprised of particles with a diameter of less than 5 $\mu m$ and greater than 0.2 $\mu m$.

6. Monoclinic zirconium dioxide as recited in claim 4, wherein the average particle diameter is from 0.5 $\mu m$ to 2.0 $\mu m$, and the specific surface area is in a range of 5 $m^2/g$ to 12 $m^3/g$ and the $SiO_2$ content is below 0.5% by weight.

7. Monoclinic zirconium dioxide as recited in claim 4, wherein the separated monoclinic zirconium dioxide has an average grain or particle size of 0.5 $\mu m$ to 3 $\mu m$.

8. Monoclinic zirconium dioxide as recited in claim 4, wherein the process step of quenching the melt includes contacting the stream of melt while in free fall with compressed air exiting from nozzles.

9. Monoclinic zirconium dioxide as recited in claim 8, wherein the process step of quenching the melt includes spraying water at said free fall stream after the stream is contacted with air.

* * * * *